INVENTORS
HENRY WARREN DENISON
BY LLOYD E. JOHNSON

ATTORNEYS

March 6, 1962 H. W. DENISON ETAL 3,023,978
SPINNING REEL
Filed Aug. 5, 1957 2 Sheets-Sheet 2
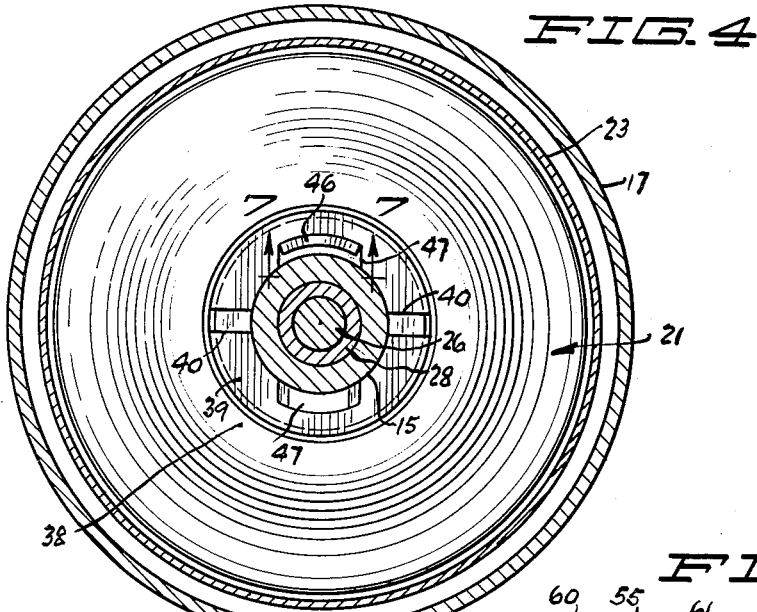
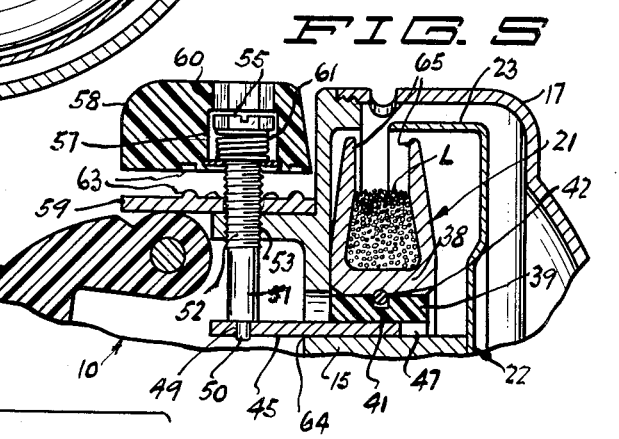
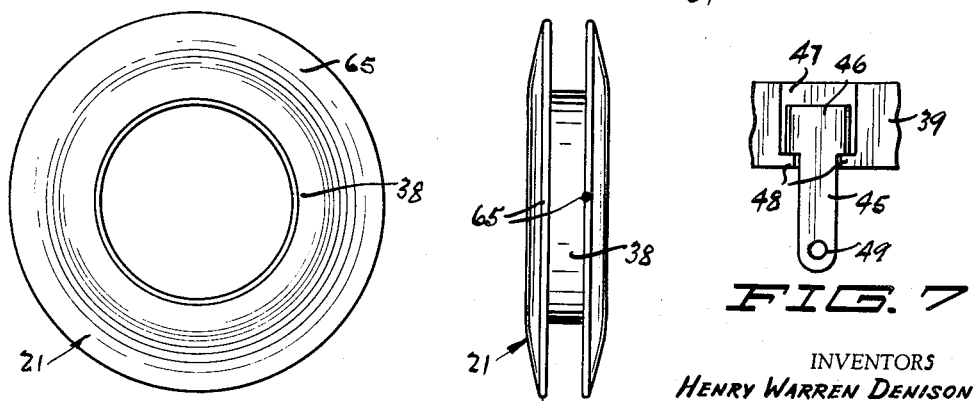
INVENTORS
*Henry Warren Denison*
BY *Lloyd E. Johnson*
*Carlsen & Hoyle*
ATTORNEYS

United States Patent Office 3,023,978
Patented Mar. 6, 1962

3,023,978
SPINNING REEL
Henry Warren Denison, Mankato, Minn.; F. Evelyn Denison, special administratrix of the estate of said Henry Warren Denison, deceased, and Lloyd E. Johnson, Mankato, Minn., assignors to Denison-Johnson, Inc., Mankato, Minn., a corporation of Minnesota
Filed Aug. 5, 1957, Ser. No. 676,078
7 Claims. (Cl. 242—84.5)

This invention relates to improvements in fishing reels of the type in which the line carrying spool does not revolve as the line is cast, so that the reel will not backlash. Such reels are commonly known as spinning reels and while they are usually used in conjunction with special spinning rods they are also useful upon casting and fly rods, if the reels are properly made, and are accordingly quite versatile.

The general type of reel with which our present invention is concerned is that shown in our prior Patents Nos. 2,644,647 and 2,667,312, as well as in our copending application Serial No. 551,297, filed December 6, 1955, now Patent No. 2,862,679. In each instance the reels are characterized in that they are of the so-called closed variety, having a frame including a removable cover over the line spool and said cover having an opening out through which the line passes. The spool is normally stationary and line is spooled thereon by a rotary member having a controlled, projectable pick-up element to engage the line. A crank is operatively arranged to rotate said rotary spooling member and a thumb or control piece is provided to release the line for casting as well as to snub the line at the end of a cast.

One very desirable feature of fishing reels of this nature, in addition to their fool-proof operation with no backlash problem, lies in that they may be used with very light monofilament lines, as is well known to all skilled in the art. Such lines, having relatively low tensile strengths, must be manipulated with care in playing a heavy fish and in the reels of our design provision in the form of an adjustable drag is made to allow controlled rotation of the line spool under the pull of the line so that, even though the fisherman may be turning the crank of the reel in the attempt to bring in the fish, the line may actually by running out from the reel as the fish pulls. If this action is properly controlled the fish will not break the line even though exerting a pull greater than would otherwise exceed the breaking strength of the line.

It is the primary object of our present invention to provide a spool, drag and drag adjustment mechanism all of which cooperate to provide readily and consistently accurate controlled resistance to such rotation of the spool as is necessary when the line is pulled from the reel by the fish, and which will function effectively to permit the line to flow from the reel when the tension on the line is safely below its breaking point. Another object is to provide a drag of an internal expanding type acting on the internal periphery of an annular spool so as to provide even and smooth frictional braking or drag contact, and enabling us to use metal for the spool itself while using a "plastic" such as nylon for the expanding drag element. These materials have the desirable differing coefficients of friction but heretofore it has been necessary for mechanical and manufacturing reasons to make the spool itself of the non-metallic material with the result that the spools were subject to breakage, warping, etc. Still another object is to provide a drag adjustment which not only includes a dial or scale indicating the adjustment of the drag and making it possible to use numerals to indicate drag adjustment which bear accurate reference to the breaking strength of the line in use, but which adjustment may be readily varied (as to its overall range of friction effective on the spool) from outside the case of the reel and in a simple manner.

Another and important object of our invention is to provide a reel spool and cooperating drag member arrangement in which the spool is readily removable for replacement by another carrying a different line, and in which said spool itself is formed with a line receiving space or groove of novel contour particularly suited to use with monofilament lines. As is well known such lines have a tendency to stretch when placed under tension and to return to original condition when relieved of such tension. In winding these lines upon the narrow spools used in spinning reels the line is wound on under tension but then the inner convolutions of the line, in particular, have a tendency to relax or expand somewhat. This has created somewhat of a problem in the past and the outer turns of line have had a tendency to snap off the spool as the inner turns relax and become what might be referred to as spongy or flaccid in nature. In accordance with our invention the line receiving groove, which is formed around the core and between the flanges of the spool, is wider at its center than about the outer edges of the spool. Not only does this shape of the groove provide needed expansion space for the inner convolutions of the line coiled in the groove but the narrow outer edge of the groove aids in holding the line against unwanted escape off the sides of the spool and facilitates "level winding" of the outer turns of the line, which part of the line sees the greatest use. A spool so formed is also very strong and the line carrying capacity for a given spool diameter and width is great.

These and other more detailed and specific objects will be disclosed in the course of the following specification, reference being had to the accompanying drawings, in which—

FIG. 4 is a cross sectional view taken substantially along the line 4—4 in FIG. 3 and viewing the line spool in end elevation.

FIG. 5 is a fragmentary sectional view of the upper portion of the reel as it appears in FIG. 3 but illustrating the manner in which the drag adjusting knob or indicator element is lifted when adjustments are made to vary the operating range of the drag.

FIG. 6 is a composite end and edge elevational view of the spool alone.

FIG. 7 is a fragmentary detail view taken substantially along the line 7—7 in FIG. 4.

Figure 1:
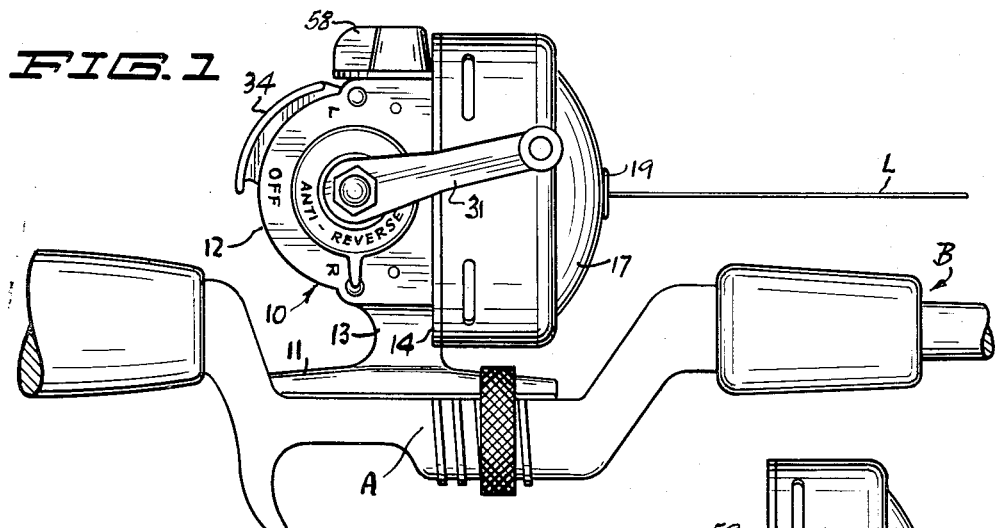
FIG. 1 is a side elevation of our improved spinning reel and showing the same as mounted in its operative position upon the reel seat of a fishing rod.

Referring now more particularly and by reference characters to the drawing the reel comprises a frame, designated generally at 10, having the usual tang 11 by which the reel is mounted upon the conventional reel seat A of a fishing rod, designated generally at B. In the present drawings the rod B is of the casting variety but it is to be understood that our reel is also useful on the ordinary spinning rod or flyrod in which case the reel would be suspended below the axis of the rod. As has been pointed out in detail in our copending application hereinbefore identified the reel is completely reversible in order to accommodate it to use on all such rods, and for either left or right-hand operation. The mechanism and the manner by which such reversibility of the reel is carried out will not be set forth in detail herein since they are not material to an understanding of the present invention.

The frame 10 includes an arcuate housing wall 12 connected to the aforesaid tang 11 by means of a stem or shank 13 and forwardly of said housing wall the frame further includes a circular end plate 14 formed with a stationary, tubular and forwardly extending bearing 15. In addition said end wall 14 has a forwardly directed peripheral threaded flange 16 onto which the rear end of a cover 17 may be threaded, as indicated at 18. The rear portion of said cover 17 is cylindrical in shape but forwardly thereof the cover is rounded off toward the center at which center there is located a line guide eyelet or grommet, designated generally at 19. When this cover is disposed in place upon the frame 10 it encloses the forwardly located working components of the reel, but the cover is provided with a series of openings 20 providing for air circulation as necessary to dry the parts within the cover.

Figure 3:
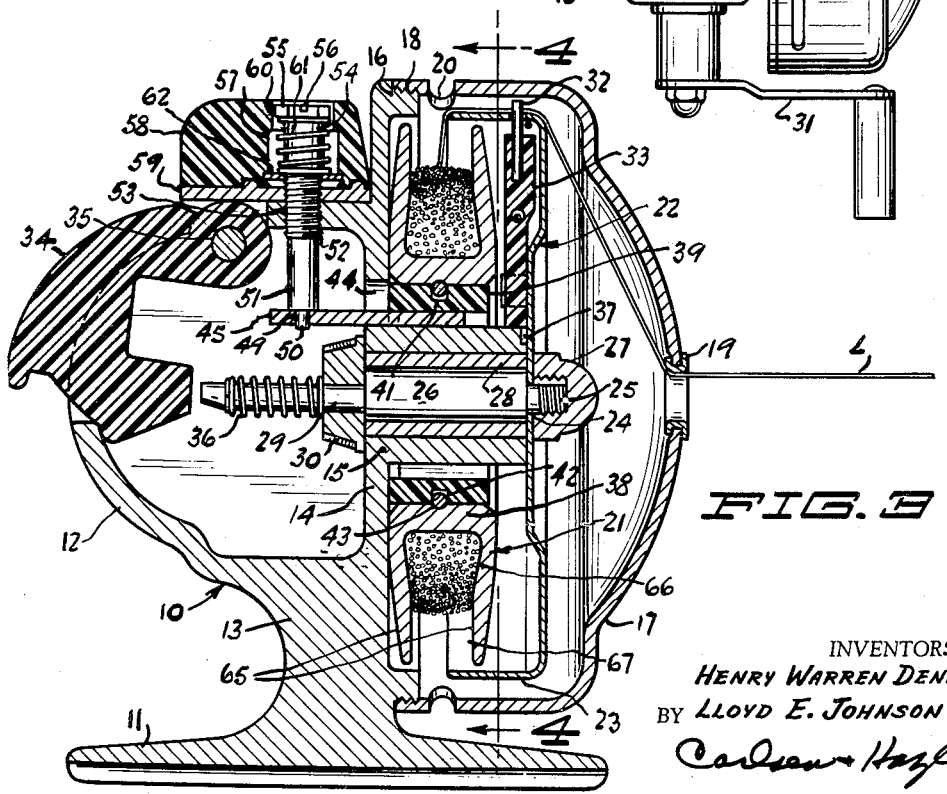
FIG. 3 is an enlarged diametrical sectional view through the reel.

The fishing line L is wound upon a line spool, designated generally at 21, which is positioned around the aforesaid bearing 15 up against the forward face of the end wall 14, as clearly shown in FIG. 3. The specific and novel construction of this line spool 21 will be presently described but it is sufficient to note at this point that it is formed with a groove opening outwardly so that the line L may be wound in multiple convolutions around the core of the spool. Located forwardly of the spool 21 is a spooling member 22, circular in shape and provided with a rearwardly extending cylindrical flange 23 which projects rearwardly over and outwardly of the peripheral edge of the spool in the normal position of the parts, as is seen in FIG. 3. At its center the spooling member 22 has an opening 24 to accommodate the reduced and threaded forward end 25 of an actuating shaft 26 and to which shaft the spooling member is releasably fastened by means of a cap nut 27. A bushing or sleeve 28 is tightly fitted into the hollow bearing 15 to slidably and rotatably accommodate this shaft 26 and at a point immediately to the rear of the end wall 14 the shaft is again reduced, as indicated at 29, for slidable but relatively non-rotatable engagement with a drive pinion 30. This drive pinion 30 is engaged and driven by a gear (not shown) operated by the usual crank 31 so that when this crank is turned the spooling member 22 will be rotated, as will be readily understood. Normally projecting beyond the peripheral surface of the flange 23 of spooling member 22 is a pick-up pin or element 32 and the line L as it passes from the spool 21, forwardly across said flange 23 and then inwardly toward center and out through the eyelet 19, will be engaged by this pick-up pin or element 32 so that as the spooling member is rotated the line will be coiled upon the spool 21. To free the line for casting the pick-up pin or element 32 is retracted inwardly toward the axis of rotation of the spooling member 22 leaving the flange 23 clear of any obstructions so that the line may flow freely off the spool 21 without requiring rotation of the latter. Here again the mechanism for so positioning the pick-up pin or element 32 has been described in detail in our prior patents and application hereinbefore identified and it is believed sufficient at this point to note that the pin is carried in a carrier 33 movably mounted within the spooling member 22 and normally biased to move in an inward direction. The inner end of the carrier 33 rests upon the forward end of the bearing 15, but by the actuation of a control member or thumb piece 34 which pivots about a cross pin 35 the shaft 26 may be thrust in a forward direction (through pinion 30) carrying the spooling member forward until the carrier 33 clears the end of the bearing 15 whereupon the line may be cast. Such forward motion of the shaft 26 and spooling member 22 is yieldably resisted by means of an expansion coil spring 36 on the rear portion of the shaft and which also serves to hold the drive pinion 30 in position against the rear face of the end plate 14. When the spooling member 22 is thrust forward to its forwardmost position the line L will be snubbed between an outer portion of this member and the inner surface of the cover 17 so that control may be exercised over the outward flow of the line and the same may be snubbed at the end of a cast. When the control member 34 is then released and the crank 31 turned to initiate the rewinding of the line the spring 36 tends to restore the shaft 26 to its original position and, as the shaft turns, a cam surface 37 on the forward end of the bearing 15 will engage the inner end of the carrier 33 and again project the pick-up pin or element 32 outward to its line winding position.

As thus far described the structure of the reel is essentially like that disclosed and claimed in our copending application identified supra and it will be understood that while the line spool 21 is normally stationary it is permitted adjustably retarded or braked rotation, as is necessary in order to permit the line L to flow from the reel when playing a heavy fish. Thus while the fisherman may be turning the crank 31, and thus rotating the spooling member 22 to cause the pick-up pin or element 32 to tend to spool the line upon the spool, this rotation of the spool itself will permit the same to turn and the line actually to move in the opposite direction or outward from the reel. The mechanism for controlling the spool is commonly referred to as a drag and its adjustment and operation must be both accurate and consistent if lines of very light test are to be used as is the common custom with reels of this type. It is this drag mechanism and its adjustment in association with the spool 21 with which our present invention is concerned, as will now be set forth.

It will be noted in FIG. 3 that the spool 21 has a core 38 the internal diameter of which is considerably greater than the external diameter of the bearing 15 and in the intervening annular space thus formed there is positioned a hollow expandable drag member and bearing support for the spool in the form of a cylindrical collar 39, the internal and external diameters of which are such as to properly and respectively fit the bearing 15 and the core of the spool. This drag member 39, as it will hereinafter be called for the sake of brevity, is made up from "plastic" such as nylon and in order that it may be expanded or contracted the member is notched out at diametrically opposed points 40 for almost its full axial length, thus forming two semi-circular but connected portions having freedom for relative motion in radial directions. The drag member is also formed with an external groove 41 opening through its outer periphery for the accommodation of an ordinary snap ring 42 having a free external diameter slightly larger than that of the drag member in order to fit into a shallow groove 43 formed for the accommodation of the ring about the inside of the spool core 38. Thus the spool 21 may be readily snapped into place over the drag member or removed therefrom and the snap ring 42 will contract slightly as necessary in removing or replacing the spool. This is an extremely convenient feature of the reel in that it is customary to carry a number of spools of line which differ in tensile strength so that the same reel may be used in fishing for different varieties of fish and under different conditions.

In alignment with the space between the bearing 15 and the spool core 38 the end plate 14 has an opening 44 and with the reel in the position shown herein such opening is located above the bearing 15. Passing through this opening 44 in a forward-rearward direction is an adjusting shoe or lever 45 the forward heel end 46 of which is not only pressed to an arcuate shape, as viewed from the front as is seen in FIG. 4, but is also widened as is seen to best advantage in FIG. 7. This widened heel end 46 is fitted into either of two diametrically opposed internal grooves 47 formed in the inner peripheral surface of the drag member 39 and at their rear ends the grooves 47 are provided with inward projections 48 so as to prevent relative axial displacement of the drag member 39 and the shoe 45 when the latter is properly held against forward and rearward movement. For the latter purpose and also for the adjustment of the drag mechanism the shoe 45 has an aperture 49 at its rear end for the reception of the reduced lower end 50 of a drag adjusting screw 51 having a threaded center portion 52 threaded through a tapped opening 53 in the upper forward portion of the housing wall 12. It will be obvious, therefore, that the screw 51 will thus not only prevent forward-rearward displacement of the shoe 45, and thus of the drag member 39, but also that the screw may be moved upwardly sufficiently to free its lower end 50 from the aperture 49 to permit assembly and disassembly of these components of the reel.

Figure 2:
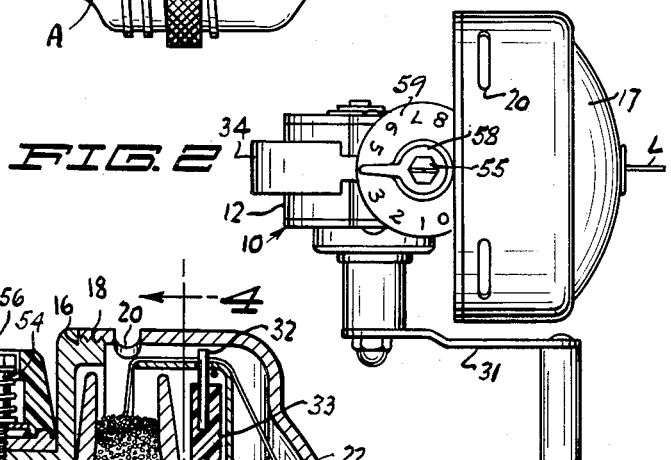
FIG. 2 is a top plan view of the reel alone in the position of FIG. 1.

Upwardly of its threaded center portion 52 the adjusting screw 51 has a stem portion 54 of somewhat larger diameter terminating at its upper end in a hexagonal or other non-circular head 55 in which is the usual screwdriver kerf 56. This portion of the screw is received within a recess 57 in a combination adjusting knob and pointer 58 and the latter is located over a dial plate 59 through which the screw loosely passes and which is positioned flat upon the upper, forward portion of the housing wall 12 and behind the end wall 14. The upper portion of the recess 57, here designated at 60, is hexagonal or otherwise correspondingly shaped to non-rotatably fit the head 55 of the screw so that normally rotational movement of the knob 58 will also turn the screw. The position of the knob and the screw when thus rotated is indicated by a scale on the dial plate 59, as is seen in FIG. 2, and normally the knob and screw are held in the proper relative axial positions to maintain driving contact between the knob and screw by means of an expansion coil spring 61 braced between the screw head 55 and a plate 62 pressed into the lower end of the recess 57 and loosely surrounding the screw. A detent action in order to prevent unwanted relative rotation of the knob 58 with reference to the dial plate 59 is provided by a circular, spaced series of shallow notches having mating lugs upon the adjacent faces of these parts, indicated at 63 in FIG. 5.

It will now be understood that, as the knob 58 and screw 51 are turned in a direction such as to move the latter downward or toward the axis of bearing 15, the result will be to force the rear end of the shoe 45 in the same direction, causing the shoe to rock very slightly about a fulcrum point 64 (FIG. 5) and move its forward end 46 upward or away from the bearing axis. This motion expands the drag member 39 increasing its frictional drag or braking force upon the spool 21 and thus increasingly retarding the rotation of the spool. Opposite motion of the knob 58 and screw 51 releases this force on the shoe 45 and diminishes the drag, of course. By use of fine threads on the screw 51 this adjustment may be made very precise, to the point where the position of the knob 58 as indicated by the scale on dial plate 59 will accurately reflect the drag adjustment relative to the line breaking strength. For example a fisherman using a six pound test line may adjust the knob 58 to registry with the numeral "6" on the scale and may then rest assured that the reel will release line before the breaking point of the line is reached, or if he prefers may adjust the drag to position "5" to release line under even less pull thereon. When spools are changed to use the same reel with lines which are much heavier the magnitude of the drag adjustment range may be readily changed without opening the reel simply by lifting the knob 58 to the position of FIG. 5 so that it releases the head 55 of the screw and then, using an ordinary screwdriver, the screw may be independently adjusted and the drag increased. Then with the knob in proper alignment with the screw head the knob is released and the spring 61 will return it to driving engagement with the screw, as before. This adjustment feature is also of advantage in compensating for wear on the drag mechanism as time goes on.

The line spool 21 according to our present invention is made of metal not only for added strength and freedom from breakage but to obtain this advantageous braking action which comes from the use of the non-metallic drag member 39 and the differing coefficients of friction of this member and the spool. Also of importance is the shape of the spool, or more specifically of the groove or space therein around which the line is coiled. As will be seen to best advantage in FIG. 3 this groove or space, between the flanges 65 of the spool is wider, axially of the spool, near the core as is designated at 66 and is quite narrow at its outer portion 67. Thus space is provided toward the center of the spool for the line to expand as it will when wound on the spool under tension while the "working" outer portion of the line which is used the most is confined so that outer coils will not snap off the spool, as monofilament lines are prone to do, all without reducing the total line carrying capacity of the spool for a given size. The narrow outer portion of the line receiving groove about the spool also aids in what might be called level-winding the said "working" portion of the line in that the coils as they are laid on the spool by the revolving spooling member 22 will tend to evenly distribute themselves and not bunch up unevenly to possibly interfere with the next cast.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. For a fishing reel, a frame having a bearing, a cylindrical collar drag member disposed about the bearing in a contact relation and having an internal axially extending groove facing the bearing and a radial axially extending notch circumferentially displaced from said groove, a line spool disposed about and supported by the drag member, a drag actuating shoe member extending through the frame into said groove holding the drag against rotation and pivoted on a fulcrum stationarily associated with the frame, means outside the reel operatively connected to said shoe for pivoting same about the fulcrum to radially expand a portion of the drag member for braking the line spool, and means for spooling a line on the line spool.

2. A drag and line spool support for a fishing reel having a frame with a bearing thereon and a line spooling member supported on a drive shaft rotatably disposed through the bearing, means for rotating the drive shaft to spool a line, the improvement comprising a plastic tubular internally axially grooved and radially notched drag member disposed about the bearing and having an external circumferentially extending groove, a snap ring disposed in the circumferential groove, a line spool having a metallic core fitted around the drag member and with a groove receiving the snap ring, a drag actuating shoe extending through the frame into the internal groove and along the bearing and having a fulcrum stationarily associated with the frame, means on the frame for pivoting the shoe on the fulcrum for radially urging a portion of the drag member toward the line spool core to variably frictionally engage same.

3. A drag and line spool support for a fishing reel having a frame with a bearing thereon and a line spooling member supported on a drive shaft rotatably disposed through the bearing, means for rotating the drive shaft to spool a line, the improvement comprising a flexible tubular internally axially grooved and radially notched drag member disposed about the bearing and having an external circumferentially extending groove, a snap ring disposed in the circumferential groove, a line spool having a metallic core fitted around the drag member and with a groove receiving the snap ring, a drag actuating shoe extending through the frame into the internal groove and along the bearing and having a fulcrum stationarily associated with the frame, means on the frame for pivoting the shoe on the fulcrum for radially urging a portion of the drag member toward the line spool core to variably frictionally engage same.

4. A drag and line spool support for a fishing reel having a frame with a bearing thereon and a line spooling member supported on a drive shaft rotatably disposed through the bearing, means for rotating the drive shaft to spool a line, the improvement comprising a resilient non-metallic tubular internally axially grooved and radially notched drag member disposed about the bearing and having an external circumferentially extending groove, a snap ring disposed in the circumferential groove, a line spool having a metallic core fitted around the drag member and with a groove receiving the snap ring, a drag actuating shoe extending through the frame into the internal groove and along the bearing and having a fulcrum stationarily associated with the frame, means on the frame for pivoting the shoe on the fulcrum for radially urging a portion of the drag member toward the line spool core to variably frictionally engage same.

5. In a fishing reel, a frame including a plate having a tubular bearing extending therefrom, an expandable drag member encircling said bearing, a line spool mounted for rotation on and about the outer surface of the drag member, an adjusting shoe extending through an aperture in the plate adjacent to the bearing and with one end in engagement with the drag member for expanding the same into frictional contact with the line spool when the shoe is tilted in said aperture, a manually operated screw threaded in a portion of the frame for engaging the other end of the shoe to tilt the same, said shoe being engaged in the aperture and by the screw so as to be restrained against axial or rotational movement, and means connecting said shoe and drag member operative to restrain the latter against axial or rotational movement on the bearing.

6. In a fishing reel, a frame having an end plate with a tubular bearing extending therefrom, a line spool having a metallic core mounted for rotation about said bearing, a radially expandable drag member disposed between the tubular bearing and said core for frictionally engaging the inner surface of the core, means for restraining the drag member against rotational and axial movement with respect to the bearing while permitting said radial expansion thereof, said means including a lever acting shoe extending through the end plate for tilting action with respect thereto and with one end in engagement with the drag member to expand the same against the spool core, a screw threaded in a portion of the frame and with its inner end in engagement with the other end of the lever acting shoe to tilt the latter, the outer end of the screw having a non-circular head, a knob mounted on the outer end of the screw and being axially movable with respect thereto into two positions, said knob having an opening shaped to conform with the shape of said non-circular head and adapted to engage the same, when in one of said positions, whereby the knob may be turned to adjust the screw, said knob opening being disengageable from the screw head, when the knob is moved to the other of its two positions, whereby the screw and knob will be free to be rotated with respect to each other.

7. In a fishing reel, a frame having an end plate with a tubular bearing extending therefrom, a line spool having a metallic core mounted for rotation about said bearing, a radially expandable drag member disposed between the tubular bearing and said core for frictionally engaging the inner surface of the core, means for restraining the drag member against rotational and axial movement with respect to the bearing while permitting said radial expansion thereof, said means including a lever acting shoe extending through the end plate for tilting action with respect thereto and with one end in engagement with the drag member to expand the same against the spool core, a screw threaded in a portion of the frame and with its inner end in engagement with the other end of the lever acting shoe to tilt the latter, the outer end of the screw having a non-circular head, a knob mounted on the outer end of the screw and being axially movable with respect thereto into two positions, said knob having an opening shaped to conform with the shape of said non-circular head and adapted to engage the same, when in one of said positions, whereby the knob may be turned to adjust the screw, said knob opening being disengageable from the screw head, when the knob is moved to the other of its two positions, whereby the screw and knob will be free to be rotated with respect to each other, and means for yieldably urging the knob into the first of its said two positions.

References Cited in the file of this patent

UNITED STATES PATENTS

| | | |
|---|---|---|
| 1,800,851 | Wennerstrom | Apr. 14, 1931 |
| 2,429,782 | Versoy | Oct. 28, 1947 |
| 2,440,452 | Smith | Apr. 27, 1948 |
| 2,574,718 | Swigerd | Nov. 13, 1951 |
| 2,668,025 | Hull | Feb. 2, 1954 |
| 2,705,113 | Bonanno | Mar. 29, 1955 |
| 2,719,680 | Denison et al. | Oct. 4, 1955 |
| 2,734,693 | Rabezzana | Feb. 14, 1956 |
| 2,772,839 | Morton | Dec. 4, 1956 |
| 2,828,927 | Yeada | Apr. 1, 1958 |
| 2,863,616 | Hutchison et al. | Dec. 9, 1958 |

FOREIGN PATENTS

| | | |
|---|---|---|
| 760,981 | Great Britain | Nov. 7, 1956 |